US012587441B2

(12) United States Patent (10) Patent No.: US 12,587,441 B2
Suraparaju (45) Date of Patent: Mar. 24, 2026

(54) METHOD AND SYSTEM FOR MANAGING PROGRAMMABLE IOT DEVICES

(71) Applicant: Konica Minolta Business Solutions U.S.A., Inc., Ramsey, NJ (US)

(72) Inventor: Rahul Suraparaju, Fremont, CA (US)

(73) Assignee: Konica Minolta Business Solutions U.S.A., Inc., Ramsey, NJ (US)

( * ) Notice: Subject to any disclaimer, the term of this patent is extended or adjusted under 35 U.S.C. 154(b) by 11 days.

(21) Appl. No.: 18/401,033

(22) Filed: Dec. 29, 2023

(65) Prior Publication Data

US 2025/0219899 A1 Jul. 3, 2025

(51) Int. Cl.
*G06F 15/177* (2006.01)
*H04L 41/0806* (2022.01)

(52) U.S. Cl.
CPC .............................. *H04L 41/0806* (2013.01)

(58) Field of Classification Search
CPC ................................................. H04L 41/0806
USPC ........................................................ 709/222
See application file for complete search history.

(56) References Cited

U.S. PATENT DOCUMENTS

| | | | | |
|---|---|---|---|---|
| 10,097,372 | B2 * | 10/2018 | Bhattacharya | ........ H04L 45/745 |
| 10,164,971 | B2 * | 12/2018 | Mathew | ................ H04L 63/18 |
| 10,257,205 | B2 * | 4/2019 | Mathew | ............. G06F 21/6218 |
| 10,298,491 | B2 * | 5/2019 | Kumar | .................... H04L 45/26 |
| 10,771,590 | B2 * | 9/2020 | Tomkins | ........... H04L 45/74591 |
| 10,785,634 | B1 * | 9/2020 | Fiorese | ................ H04L 41/147 |
| 11,202,335 | B2 * | 12/2021 | Ashrafi | ............... H04B 7/0871 |
| 11,363,116 | B2 * | 6/2022 | Tomkins | ........... H04L 45/74591 |
| 2022/0239591 | A1 * | 7/2022 | Barton | .................... H04L 45/22 |
| 2022/0337679 | A1 * | 10/2022 | Cook | ...................... H04L 67/12 |
| 2025/0063365 | A1 * | 2/2025 | Ong | ................... H04W 12/121 |

* cited by examiner

*Primary Examiner* — Alicia Baturay
(74) *Attorney, Agent, or Firm* — .Buchanan Ingersoll & Rooney PC

(57) ABSTRACT
A method, a non-transitory computer readable medium, and a controller for managing programmable IoT devices. The method includes: obtaining, by a computer system, data associated with supported protocols for configuring a plurality of IoT devices; obtaining, by the computer system, configuration operations for the plurality of IoT devices; curating, by the computer system, configuration abstractions from the data associated with supported protocols for configuring the plurality of IoT devices and the configuration operations for the plurality of IoT devices; and transforming, by the computer system, the configuration abstractions for the plurality of IoT devices into software-defined configuration abstractions.

17 Claims, 6 Drawing Sheets

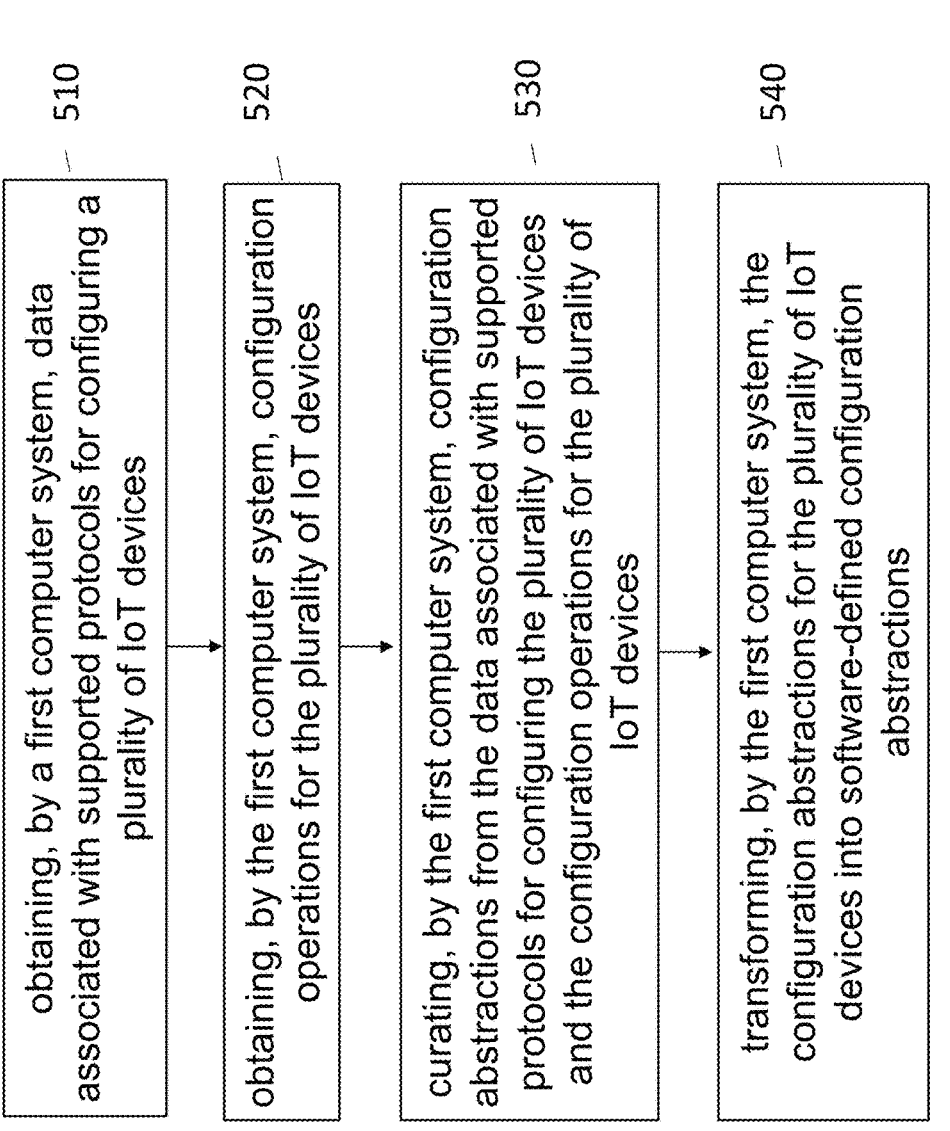

500

510 obtaining, by a first computer system, data associated with supported protocols for configuring a plurality of IoT devices

520 obtaining, by the first computer system, configuration operations for the plurality of IoT devices

530 curating, by the first computer system, configuration abstractions from the data associated with supported protocols for configuring the plurality of IoT devices and the configuration operations for the plurality of IoT devices

540 transforming, by the first computer system, the configuration abstractions for the plurality of IoT devices into software-defined configuration abstractions

FIG. 5

METHOD AND SYSTEM FOR MANAGING PROGRAMMABLE IOT DEVICES

FIELD OF THE DISCLOSURE

The present disclosure generally relates to a method and system for managing programmable Internet of Things (IoT) devices, and more particularly to a method and system for software defined networking (SDN) overlay for IoT devices.

BACKGROUND

Current configurations and monitoring operations involved in IoT-based solutions are not productivity-friendly. For example, repeated administrative operations are required on each IoT device. IoT devices, for example, can be a collective network of connected devices and technology that facilitates communication between devices and the cloud, as well as between the devices themselves. The types of IoT devices can include sensors, actuators, cameras, general security devices, wearable device and sensors, gadgets, appliances, or machines that are programmed for certain applications and can transmit data over the internet or other network. For example, an IoT device such as a camera can support N number of configurations, and if there exists M such cameras, the number of IoT devices that need to be supported can be a total of M×N raw configurations.

Debugging IoT devices can be also problematic. For example, IoT devices configurations can be error prone. In addition, the more manual handling on the configuration of an IoT devices can provided for an increase in chances of an error prone system.

IoT devices also have a relatively weak security and security complexity. Administrator often have direct connections with a set of IoT devices and directly (raw) configuring and administering the of the IoT devices can pose security threats, and make the solution system vulnerable to security attacks, for example, via the Internet. In addition, administrative security credentials need to be set with each IoT device, and hence password management can become a nightmare.

Traditional-style stereo-type operations, administration and management (OAM) operations often mean relatively higher costs for end customers, and which can result in a smaller return on investment (ROI).

In addition, traditional-style OAM demands that administrators have a lot of technical knowledge, because the OAM demands can involve rudimentary means of administering the IoT devices.

SUMMARY

In consideration of the above issues, it would be desirable to have a method and system for managing programmable Internet of Things (IoT) devices, and more particularly to a method and system for software defined networking (SDN) overlay for IoT devices.

In accordance with an aspect, a method is disclosed for managing programmable Internet of Things (IoT) devices, the method comprising: obtaining, by a computer system, data associated with supported protocols for configuring a plurality of IoT devices; obtaining, by the computer system, configuration operations for the plurality of IoT devices; curating, by the computer system, configuration abstractions from the data associated with supported protocols for configuring the plurality of IoT devices and the configuration operations for the plurality of IoT devices; and transforming, by the computer system, the configuration abstractions for the plurality of IoT devices into software-defined configuration abstractions.

In accordance with another aspect, a non-transitory computer-readable storage medium having program instructions embodied therewith, the program instructions executable for managing programmable Internet of Things (IoT) devices, the process comprising: obtaining data associated with supported protocols for configuring a plurality of IoT devices; obtaining configuration operations for the plurality of IoT devices; curating configuration abstractions from the data associated with supported protocols for configuring the plurality of IoT devices and the configuration operations for the plurality of IoT devices; and transforming the configuration abstractions for the plurality of IoT devices into software-defined configuration abstractions.

In accordance with a further aspect, a controller is disclosed comprising: a processor configured to: obtain data associated with supported protocols for configuring a plurality of IoT devices; obtain configuration operations for the plurality of IoT devices; curate configuration abstractions from the data associated with supported protocols for configuring the plurality of IoT devices and the configuration operations for the plurality of IoT devices; and transform the configuration abstractions for the plurality of IoT devices into software-defined configuration abstractions.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a flowchart illustrating a method for managing programmable Internet of Things (IoT) devices in accordance with an exemplary embodiment.

DETAILED DESCRIPTION

Figure 1:
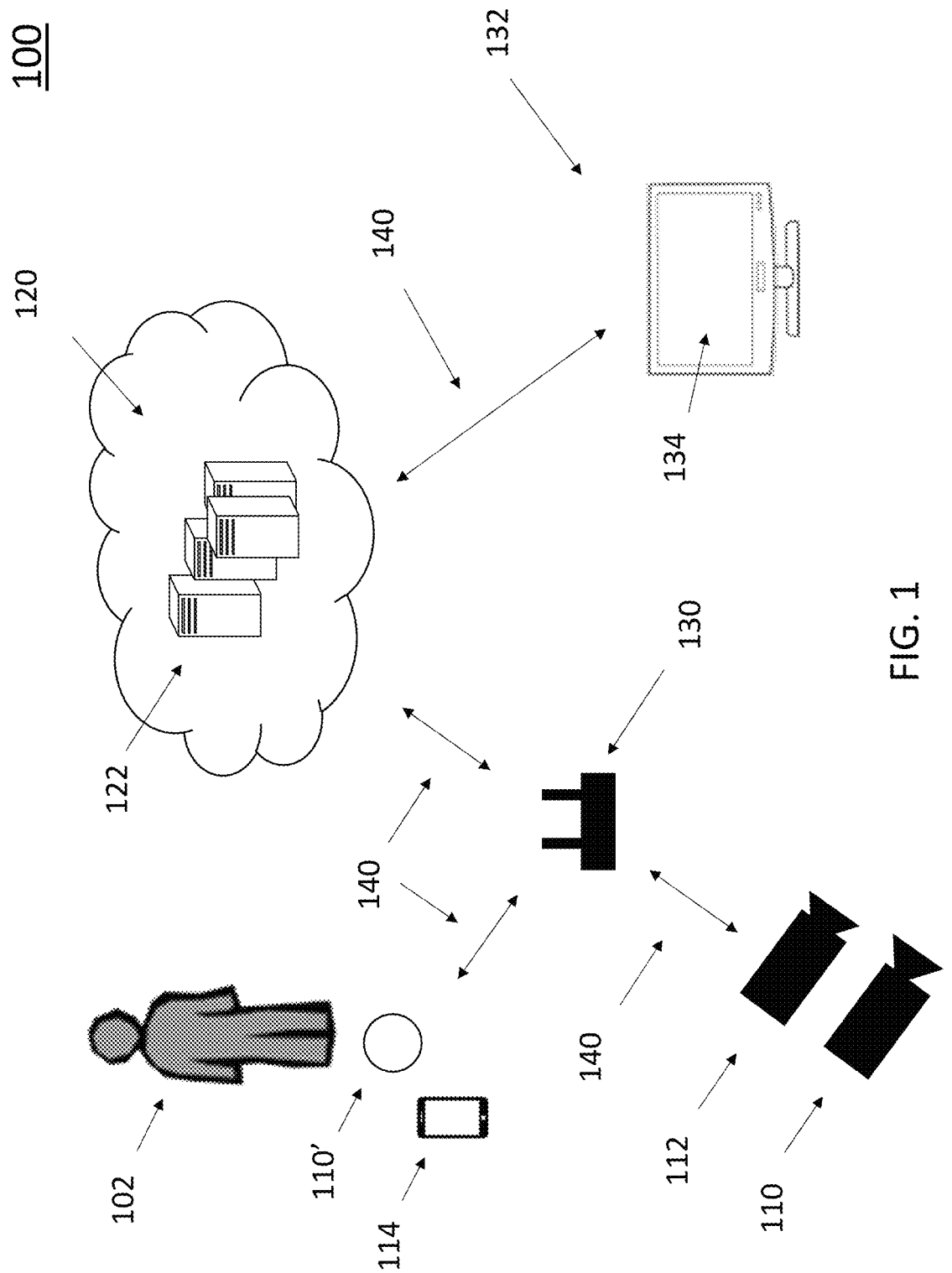
FIG. 1 is an illustration of a system for managing programmable IoT devices in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, the method and system for software defined networking (SDN) overlay for IoT devices as disclosed herein can debunk the non-sense that comes with traditional-style operations, administration and maintenance (OAM) by delivering an OAM overlay fabric that can help orchestrate the underlay device plane for IoT devices with relative ease. The OAM overlay fabric comprising a management interface that is a web based configuration tool that can manage the configuration of a plurality of IoT devices.

In accordance with an embodiment, the method and system as disclosed herein can help avail users to the benefits of, for example, "Separation of Concerns" of the plurality of IoT devices, by decoupling the control plane from business-plane (i.e., core-plane or data-plane) with a modular and scalable architecture. The control plane being configured to control forwarding of data packets, or how data is sent from a source to a destination. For example, the control plane can be responsible for various functions and processes such as routing table creation, maintenance, forwarding, establishing network policies, managing routing protocols and creating the network topology. On the other hand, the business-plane is responsible for the actual movement of data from one system to another.

In accordance with an exemplary embodiment, the method and system for software defined networking (SDN) overlay for IoT devices as disclosed herein can deliver automation across various OAM operations by delivering a bulk means of configuring and/or provisioning IoT devices such that each IoT device does not need to be configured separately, and administrators can work on curated abstraction of configurations, that has groups and policy tables and related abstractions, and includes software-defined networking (SDN) centric IoT fabric overlay controller that facilitates automation towards the underlay network of the IoT devices. For example, the method and system as disclosed herein can avoid the necessity of logging into each IoT device during the configuration process and instead, the plurality of IoT devices can be configured in a bulk fashion (i.e., more than one IoT device can be configured by an administrator rather configuring each of the plurality of IoT devices separately). For example, for a plurality of security camera, two or more, for example, 6 security cameras can be configured to be operable between 8:00 AM-6:00 PM, and another two or more, for example, two (2) security cameras can be configured to be operable between 6:00 PM-8:00 AM based on the method and system as disclosed herein.

In addition, the monitoring abstractions of the plurality of IoT devices can also automated by the SDN controller such that the number of configuration operations for the plurality of IoT device can be reduced. The OAM abstraction also provides that the administrator do not have to be tech-savvy since the SDN OAM-overlay architectures provides highest level OAM-Abstraction possible and relieves the burden from the administrators.

The method and system for software defined networking (SDN) overlay for IoT devices as disclosed herein can help deliver an unparalleled security landscape, which is critical for IoT-driven business plane and helps facilitate relatively easier up-scaling and down-scaling of IoT devices. In addition, the method and system for software defined networking (SDN) overlay for IoT devices as disclosed herein also can provide a generic SDN-centric solution that stands by itself and is self-sufficient and independent, and any particular solution vertical can leverage the principles set forth in this disclosure.

FIG. 1 is an illustration of a system 100 for managing programmable IoT devices in accordance with an exemplary embodiment. As shown in FIG. 1, the system 100 can include a plurality of IoT devices 110, a smart device 114, a cloud computing network 120, an edge device 130, and a computer system 132.

The plurality of IoT devices 110 can include, for example, devices that include sensor, processing ability, software, and other technologies that connect and exchange data with other devices and system over the Internet or other communication networks. The plurality of IoT devices 110 can includes devices in consumer, commercial, industrial and infrastructure spaces. The consumer sector can include IoT devices 110 related to connected vehicles, home automation, wearable technology, connected health, televisions, security cameras, exercise equipment, and appliances with remote monitoring capabilities. The plurality of IoT devices 110 can be configured to collects data from its environment, user inputs, or usage patterns and communicates data over the internet to and from an IoT application on the IoT device 110.

In accordance with an embodiment, the IoT application can be a collection of services and software that integrates data received from various IoT devices 110. For example, in an embodiment, the IoT application can uses machine learning or artificial intelligence (AI) technology to analyze this data and make informed decisions. The informed decisions are communicated back to the IoT device and the IoT device then responds intelligently to inputs. The plurality of IoT devices 110 can be managed through a graphical user interface, for example, a mobile application or website that can be used to register and control smart devices, for example, on a smart device (or smart phone) 114.

The plurality of IoT devices 110 can be, for example, video surveillance cameras 112, which can include indoor video surveillance cameras, outdoor video surveillance cameras, or indoor/outdoor surveillance cameras that can monitor, for example, an entire room or space without any blind spots. Alternatively, for example, in an exemplary embodiment, the plurality of IoT devices 110 can recognizing a user 102, for example, via fingerprints, electrocardiogram (ECG or EKG) information, facial images, iris, and voice recognition. For example, in accordance with an exemplary embodiment, the plurality of IoT devices 110 can include a wearable device 110', for example, a Nymi™ band, which detection of the user 102 is based on the electrocardiogram (ECG) and its unique properties, e.g., electrical activity of the heartbeat of the user (e.g., wearer) 102 can be used as an authenticator.

In accordance with an exemplary embodiment, a lifecycle of an IoT device 110 can include onboarding of the IoT device 110, configuration of the IoT device 110, operational diagnostics of the IoT device 110, security of the IoT device 110, maintenance of the IoT device 110, and end of life management of the IoT device 110. It can be appreciated that each IoT device 110 goes through the lifecycle that can be relatively burdensome since there in no current system that consolidates these processes into a single automated process as disclosed herein to help reduce the operations, administration, and management currently involved with IoT devices 110.

In accordance with an exemplary embodiment, the onboarding of IoT device 110 can include when an IoT device 110 is switched on for the very first time, the IoT device 110 needs to be onboarded into a network. However, unlike traditional devices, IoT devices 110 do not come with a full-fledged, independent interface to navigate the onboarding process. For example, the onboarding process of an IoT device 110 can include checking credentials, defining authentication protocols, and assigning an identity to the IoT device 110. In addition, IoT devices 110 on a network must be configured as per a business supported application. For example, in the case of a plurality of security cameras and/or sensors, the business supported application of a user may be to group specific IoT devices together. For example, the business supported application may be for security purposes to monitor certain areas and/or to allow access to certain areas and to control other areas in which users may not be permitted.

IoT devices 110 also require operational diagnostic since most IoT devices 110 do not have sufficient memory or computing resources to analyze diagnostics on the IoT device 110 itself. IoT devices 110 can also require maintenance, for example, updating device firmware to a latest version, security vulnerabilities, and end-of-life policies are necessary to remove an outdated or a non-functional IoT device 110 that could cause security risks to an environment of the business supported application(s).

In accordance with an exemplary embodiment, the plurality of IoT devices 110 can communicate, for example, with the edge device (or edge gateway) 130, and the cloud computing environment 120. The edge device 130 can be a device that provides an entry point into enterprise or service provider core networks. Examples of edges devices can include routers, routing switches, integrated access devices (IADS), multiplexers, and a variety of metropolitan area network (MAN) and wider area network (WAN) access devices. The edge device 130 can also provide connections into carrier and service provider networks. The edge device 130 can include an edge gateway layer that consists of a data aggregation system that can provide functionality, such as pre-processing of the data, securing connectivity to the cloud computing environment 120, using for example, systems such as WebSocket, an event hub, edge analytics or fog computing.

The cloud computing environment 120 can include one or more servers 122. In addition, the plurality of IoT devices 110 and the one or more servers 122 in the clouding computing environment 120 can be configured, for example, to be communicate with a computer system 132, which can be a personal computer (PC), a tablet, or smartphone. The cloud computing environment 120 provides the IoT devices with a microservice architecture, which can be polyglot and inherently secure in nature, for example, using HTTPS/ OAuth connectivity. The cloud computing environment 120 can include one or more servers 122 that are configured to store, for example, sensor data, such as time series databases or asset stores using backend data storage systems (e.g. Cassandra, PostgreSQL). The cloud computing environment 120 can be include event queuing and messaging system that handles communication that transpires in each of the tiers of the IoT devices. The three-tiers in an IoT system can include edge, platform, and enterprise and these are connected by proximity network, access network, and service network, respectively.

The smart phone 114, the one or more servers 122 of the clouding computing environment 120, the edge device 130, and the computer system 132 can include a processor or central processing unit (CPU), and one or more memories for storing software programs and data. The processor or CPU carries out the instructions of a computer program, which operates and/or controls at least a portion of the functionality of the devices of the smart phone 114, the one or more servers 122 of the clouding computing environment 120, the edge device 130, and the computer system 132. The smart phone 114, the one or more servers 122 of the clouding computing environment 120, the edge device 130, and the computer system 132 can also include an operating system (OS), which manages the computer hardware and provides common services for efficient execution of various software programs.

The plurality of IoT devices 110, the smart phone 114, the one or more servers 122 of the clouding computing environment 120, the edge device 130, and the computer system 132 can be connected via a communication network 140. The communication network 140 may include, for example, a conventional type of network, wired or wireless, and may have any number of configurations, such as a star configuration, token ring configuration, or other known configurations. The communication network 140 may include one or more local area networks ("LANs"), wide area networks ("WANs") (e.g., the Internet), virtual private networks ("VPNs"), peer-to-peer networks, near-field networks (e.g., Modbus, Bluetooth®, Zigbee), cellular networks (for example, 3G, 4G, 5G, other generations), and/or any other interconnected data path across which multiple computing nodes may communicate.

Data may be transmitted in encrypted or unencrypted form between the plurality of IoT devices 110, the smart phone 114, the one or more servers 122 of the clouding computing environment 120, the edge device 130, and the computer system 132 using a variety of different communication protocols including, for example, various Internet layer, transport layer, or application layer protocols. For example, data may be transmitted between the plurality of IoT devices 110, the smart phone 114, the one or more servers 122 of the clouding computing environment 120, the edge device 130, and the computer system 132 via the network 140 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, IMAP, SMTP, POP, WebDAV, etc.), or other known protocols.

Figure 2:
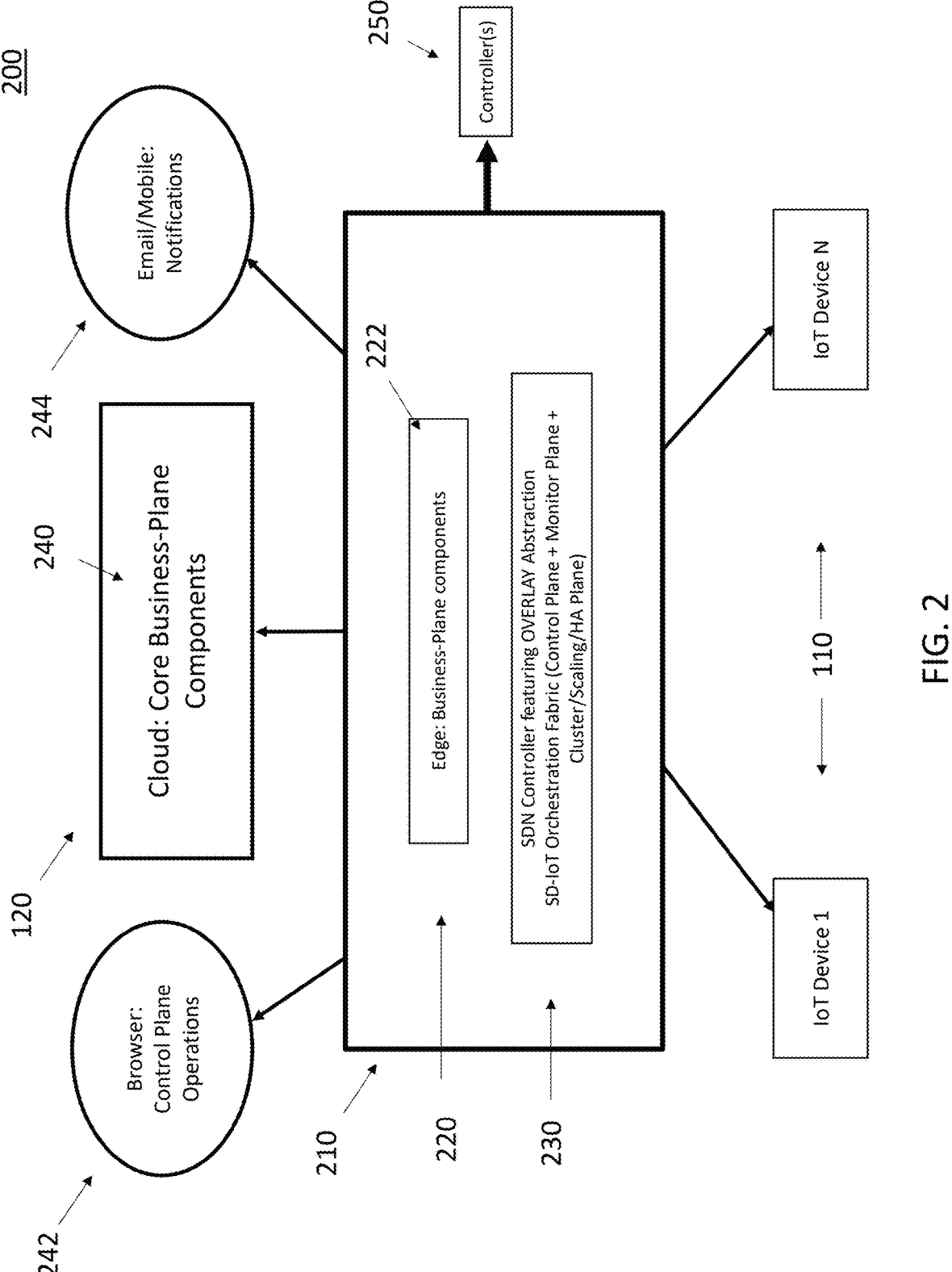
FIG. 2 is an illustration of a system for managing programmable IoT devices with a software-defined (SD) IoT orchestration fabric software defined network (SDN) overlay with programmable IoT devices.

FIG. 2 is an illustration of a system 200 for managing programmable IoT devices 110 with a software-defined (SD) IoT orchestration fabric software defined network (SDN) overlay with programmable IoT devices. As shown in FIG. 2, the system 200 includes a cloud computing network 120, a controller (or edge device) 210, and a plurality of IoT devices 110.

In accordance with an embodiment, the controller 210 is configured to receive data from a plurality of IoT devices 110 to manage, monetize, and configure data received from the plurality of IoT devices 110 using a single HTTP connection. Thus, the controller 210 can be designed to communicate with the plurality of IoT devices 110 in a centralized manner. In accordance with an embodiment, the controller 210 can be a plurality of controllers 250, for example, a cluster of controllers 210. The controller 210 is configured to communicate with a plurality of different IoT devices 110, for example, IoT Device 1 . . . IoT Device N. The plurality of IoT devices 110 can include, for example, sensors, cameras, medical and healthcare devices, wearables, transportation related devices, home automation devices, etc.

The controller 210 includes an edge component 220 and a software-defined network controller (or SDN controller) 230. The SDN controller 230 as disclosed herein can include a software program that is run on a hardware device (or computer), such as a Linux-based device or Linux device, a Hewlett Packard (HP) enterprise solution (HPE), or other computer system having scaling variability, and wherein the controller manages or directs the flow of data between the plurality of IoT devices 110 and the cloud computing environment 120. The controller 210 may, for example, may include one or more chip or microchips and/or separate hardware devices for the control of the plurality of IoT devices 110 and communicating with the cloud computing environment 120 as disclosed herein.

In accordance with an embodiment, the edge component 220 of the controller 210 is configured to provide business-plane components 222 of the plurality of IoT devices 110 to the cloud computing environment 120. The business-plane components 222 of the edge component 220 is configured to send, for example, core business plane application programming interface (API) interactions to the cloud computing environment 120. As set forth, the core business plane API interactions can include, for example, as per the business supported applications of the IoT device 110.

In accordance with an embodiment, the business-plane components 222 of the edge component 220 can send data received from the plurality of IoT devices 110 by the controller 210 to the cloud computing environment 120. In addition, the business-plane components 222 of the edge component 220 can receive communications from the cloud computing environment 120. In accordance with an embodiment, the data received from the IoT devices 110 can be processed by the edge component 220 and can include an edge gateway layer that consists of a data aggregation system that can provide functionality, such as pre-processing of the data, securing connectivity to the cloud computing environment 120, using for example, systems such as WebSocket, an event hub, edge analytics or fog computing to forward the data to the cloud computing environment 120.

In accordance with an embodiment, the SDN controller 230 includes an overlay abstraction software-defined orchestration fabric that comprise a control plane, a monitor plane and cluster, scaling, and high availability (HA) plane. For example, the control plane can manage, route, and process data from the plurality of IoT devices 110. The monitor plane can monitor the control plane and the associated data of the control plane. The cluster, scaling, and HA plane is configured to ensure that the data from the plurality of IoT devices 110 is handled in an efficient manner.

In accordance with an embodiment, the cloud computing environment 120 can include a core business-plane components 240 in which the data received from the edge component 220 can store the data received from the plurality of IoT devices 110, and can include, for example, a cloud-based IoT system that includes event queuing and messaging system. The event queuing and messaging system can also send data 244, for example, to a smart device 114 and/or a computer system 132 that provide alerts and other related data that has been received from the plurality of IoT devices 110. For example, the alerts and notifications can include unsolicited alerts and notifications that are sent to registered email addresses and/or smart device (or mobile device). In addition, the data 244 being sent to the smart device 114 and/or the computer system 132 can be an output from the data received from one or more of the plurality of IoT devices 110. For example, the output can be a compilation of data from a plurality of the IoT devices 110 in a chart, bar graph, or other format that can be utilized by a user of the smart device 114 or the computer system 132.

In accordance with an embodiment, the SDN controller 210 includes the overlay abstraction software-defined (SD)-IoT orchestration fabric for managing a plurality of IoT devices 110. The SDN controller 210 is configured to support a plurality of manufacturers and types of IoT devices 100, for example, that can include a plurality of protocols. For example, IoT device 1 may be supported by a first protocol and IoT device N may be supported by a second protocol. Thus, the SDN controller 210 can be configured to orchestrate (or manage) a plurality of components (or fabric) through the use of an overlay that can assist with the lifecycle of the plurality of IoT devices. In accordance with an exemplary embodiment, the overlay, which can be a single management interface web based configuration tool.

In accordance with an embodiment, the SDN controller 210 will include a browser that supports an underlay of a plurality of IoT devices 110, and can alleviate the need of an administrator, for example, during configuration, operational diagnostics, security, maintenance, or end of life management, from being required to log into each of the plurality of IoT devices 110. For example, a plurality of IoT devices 110 having a same manufacturer and type of IoT device 110 can be configured together using the SDN controller 210. For example, the controller 210 is able to configure a plurality of IoT devices 110 in a bulk fashion, i.e., more than one IoT device 110 of the same manufacture and type (i.e., a camera manufactured by company A) can be configured by an administrator together rather than each of the plurality of IoT devices 110 being configured separately.

As shown in FIG. 2, the controller 210 can be part of a cluster of controllers 250. The cluster of controllers 250 can be configured to be scalable as needed with a high-availability (HA) framework of application programming interfaces (APIs) with peer edge configurations.

The controller 210 can also be configured to have a browser capabilities with control plane operations 242 and being able to provide email and mobile notifications 244, for example, to a smart device 114 and/or a computer system 132. The control plane operations 242 can include, for example, establishing a network topology, or information, for example, in a routing table that defines what to do with incoming packets from the plurality of IoT devices 110.

Figure 3:
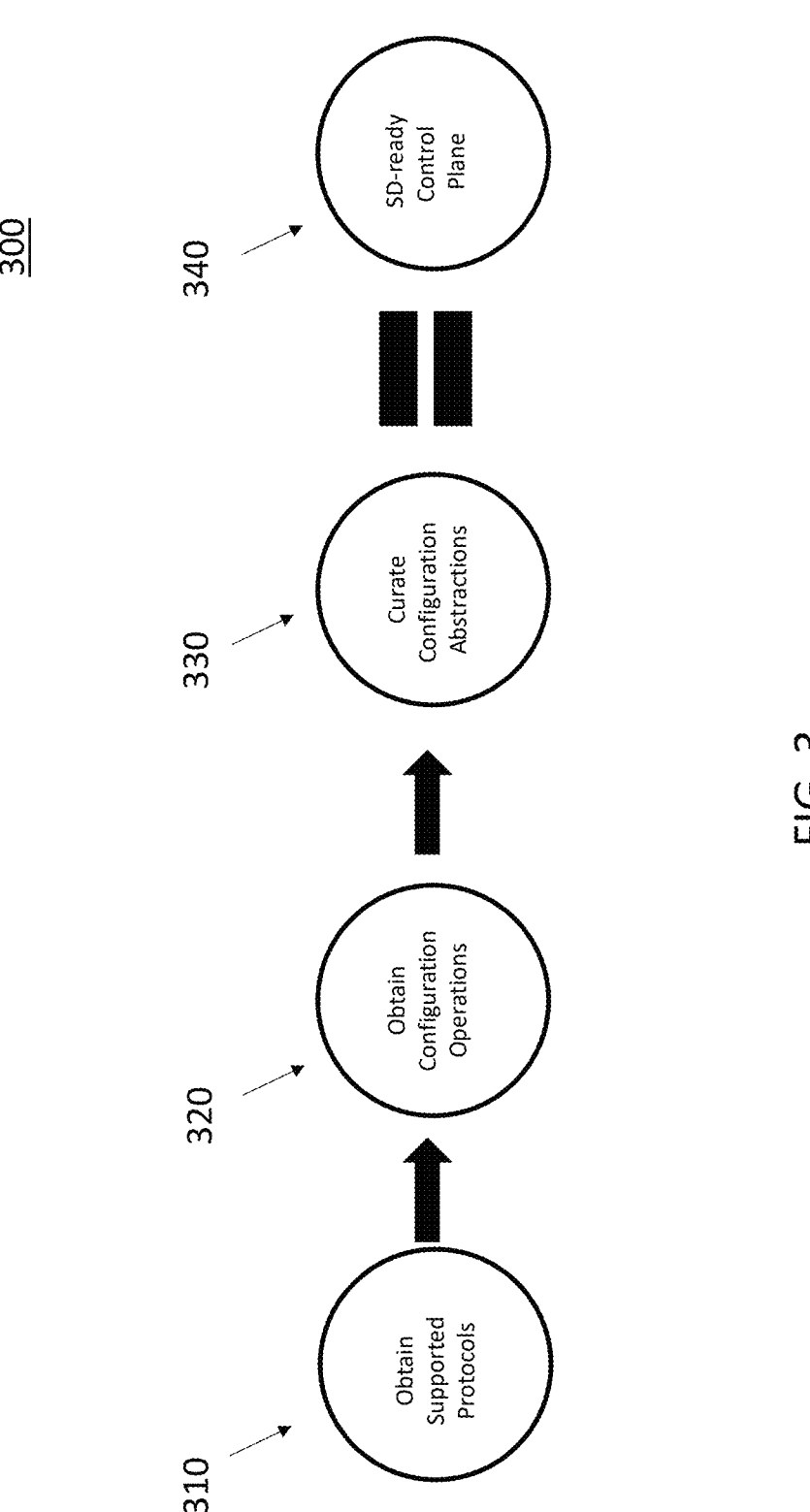
FIG. 3 is another illustration of a process for a software-defined (SD)-centric control plane abstraction layer (CPAL) that repeats for each type of IoT device that the controller is configured to support.

FIG. 3 is another illustration of a process 300 for a software-defined (SD)-centric control plane abstraction layer (CPAL) that repeats for each type of IoT device 110 that the controller 200 is configured to support. Each type of IoT device 110 can include a plurality of IoT devices 110 having the same functions and/or capabilities, for example, a security camera or sensor. As shown in FIG. 3, in step 310, the process studies the process for the configuration of each of the plurality of IoT devices 110. The process for the configuration of each of plurality of IoT devices 110 can include the various ways and support protocols for each of the plurality of IoT devices 110. In step 320, the process 330 includes collecting and gathering all configuration operations possible on a primitive-level for the plurality of IoT devices 110.

In step 330, the process executes a curation in which the process 300 selects only those operations specific to each supported business application. For example, the curation process can include for a business application presenting configuration abstractions, curating the configurations and transforming the configurations into software-defined (SD)-style configuration abstractions. The SD-style configuration abstractions can include, for example, IoT device groups, policy/rule tables, configuration tables, etc. Once the curation has been completed, in step 340, the controller 200 provides a control plane that is software-define ready (SD-ready plane).

Figure 4:
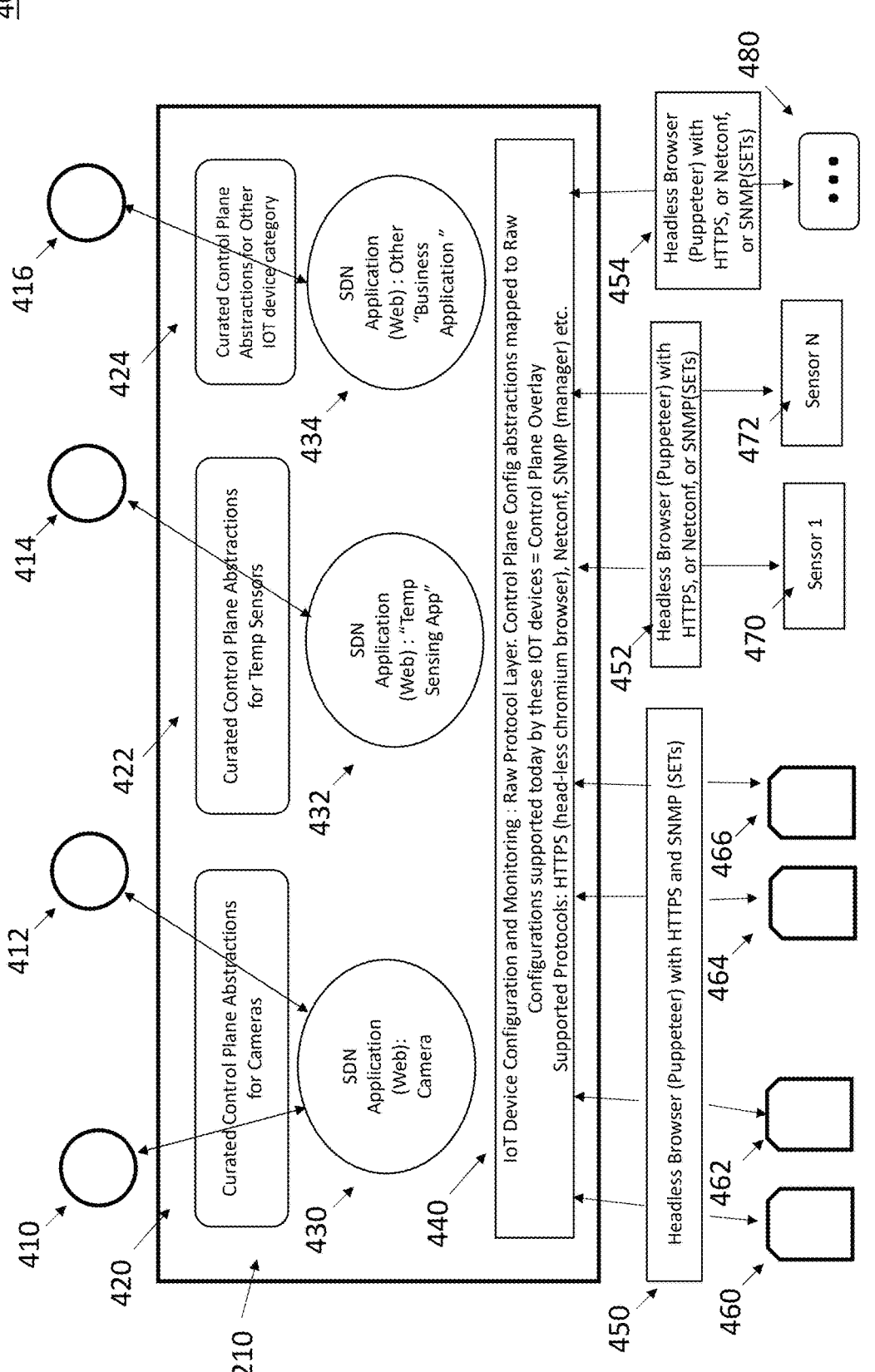
FIG. 4 is another illustration of the software-defined (SD) IoT orchestration fabric software defined network (SDN) overlay with programmable IoT devices.

FIG. 4 is another illustration of the software-defined (SD) IoT orchestration fabric software defined network (SDN) overlay 400 with programmable IoT devices. As shown in FIG. 4, the SDN overlay 400 can include the controller 210 having a plurality of curated control plane abstractions 420, 422, 424, for a plurality of IoT devices 110. The plurality of IoT devices 410 and 412 (e.g., cameras), 414 (e.g., temperature sensor), and 416 (other IoT device) can be in communication with the controller 120 via an https extension, for example, https://<edge1>/sdn/camera 410; https://<edge2>/sdn/camera 412; https://<edge3>/sdn/tsa 414; and https://<edge4>/sdn/other-sdn-app 416. For example, the controller 120 can include a curated control plane abstractions for cameras 420, a curated control plane abstractions for temperature sensors 422, and a curated control plane abstractions for other IoT devices/categories 424 is part of the controller architecture that establishes a network topology for routing, for example, incoming packets (or data).

In accordance with an exemplary embodiment, the curated control plane abstractions 420, 422, 424 are configured to allow an administrator to control the configuring of the one or more of the plurality of IoT devices 110 based on the type of IoT device 110, for example, a camera, a temperature sensor, or other IoT device/category, for example, via a display 134 on a computer system 132 (FIG. 1).

The controller 120 also includes a plurality of software-defined networking (SDN) applications 430, 432, 434, for example, web applications for each of the type of IoT devices and an IoT device configuration and monitoring application 440. For example, the controller 120 can include a SDN application (Web): Camera 430, a SDN application (Web): Temperature sensing application" 432, and a SDN application (Web): Other "Business Application" 434. The IoT device configuration and monitoring application 440 can be a raw protocol layer which includes a control plane configuration abstraction mapped to raw configurations supported (i.e., today) by the plurality of IoT devices 110 with a control plane overlay, supported protocols, HTTPS (e.g., head-less chromium browser), Netconf (Network Configuration Protocol), or SNMP (Simple Network management Protocol), for example, SNMP SET operation that can be used to modify the value of the raw configurations supported.

The SDN IoT overlay 400 can also include a plurality of Headless Browsers (for example, Puppeteer) with HTTPS and SNMP (Sets) 450, 452, 454 for each of the different type of IoT devices 110. The different types of IoT devices 110 can include, for example, a plurality of different cameras 460, 462, 464, 466 (e.g., camera 1, camera 2, camera 3, camera 4), different sensors 470, 472 (e.g., sensor 1 and sensor N), and other IoT devices 480 (e.g., other IoT device 1). In addition, each of the different type of IoT devices 460, 462, 464, 466, 470, 472, 480 can have a different configuration and corresponding configuration abstraction as disclosed herein.

FIG. 5 is a flowchart 500 illustrating a method for managing programmable Internet of Things (IoT) devices 110 in accordance with an exemplary embodiment. The method includes obtaining, by a computer system, data associated with supported protocols for configuring a plurality of IoT devices 110 (step 510); obtaining, by the computer system, configuration operations for the plurality of IoT devices 110 (step 520); curating, by the computer system, configuration abstractions from the data associated with supported protocols for configuring the plurality of IoT devices 110 and the configuration operations for the plurality of IoT devices 110 (step 530); and transforming, by the computer system, the configuration abstractions for the plurality of IoT devices 110 into software-defined configuration abstractions (step 540).

In accordance with an exemplary embodiment, the method 500 can further include generating, by the computer system, a software-defined ready control plane with the software-defined configuration abstractions for the plurality of IoT devices 110. The software-defined configuration abstractions can include one or more of grouping of IoT devices 110, policy and rules for the one or more grouping of IoT devices 110, and configuration tables for the one or more grouping of IoT devices 110.

In accordance with another embodiment, the software-defined configuration abstractions include only those software-defined configuration abstractions that are supported business applications. The supported business applications include one or more applications for generating revenue, improving efficiency, and conserving resources with the plurality of IoT devices 110.

In accordance with an embodiment, the method 500 further includes curating, by the computer system, the configuration abstractions for the plurality of IoT devices 110 that are specific to each support business application.

In accordance with another embodiment, the method 500 can include provisioning, by the computer system, a configuration from the software-defined configuration abstractions for the plurality of IoT devices 110 to one or more IoT devices 110, the one or more IoT devices 110 having a same configuration protocol. The method 500 can further include forwarding, by the computer system, the configuration from the configuration abstractions for the plurality of IoT devices 110 to the one or more IoT devices 110 in a Hypertext Transfer Protocol Secure (https) communication.

In accordance with an embodiment, the plurality of IoT devices 110 comprises a plurality of different IoT devices 110, the plurality of IoT devices 110 being one or more of cameras and sensors.

In accordance with a further embodiment, the method 500 can include mapping, by the computer system, IoT device-type specific mapping raw configurations, IoT device generated alerts, and notifications of the plurality of IoT devices 110. For example, the method 500 can include manually mapping, onto the computer system, the IoT device-type specific mapping raw configurations, the IoT device generated alerts, and the notifications of the plurality of IoT devices 110.

In accordance with another embodiment, the method 500 can include receiving, by the computer system, data from one or more of the plurality of IoT devices 110; and discovering, by the computer system, the one or more of the plurality of IoT devices 110 based on the data received from the one or more of the plurality of IoT devices 110 via a browser. The method 500 can also include discovering in realtime, by the computer system, the one or more of the plurality of IoT devices 110 based on the data received from the one or more of the plurality of IoT devices 110 via the browser.

In accordance with an embodiment, the method 500 can include monitoring and managing, by the computer system, the configuration abstractions from the software-defined configuration abstractions for the plurality of IoT devices 110.

Figure 6:
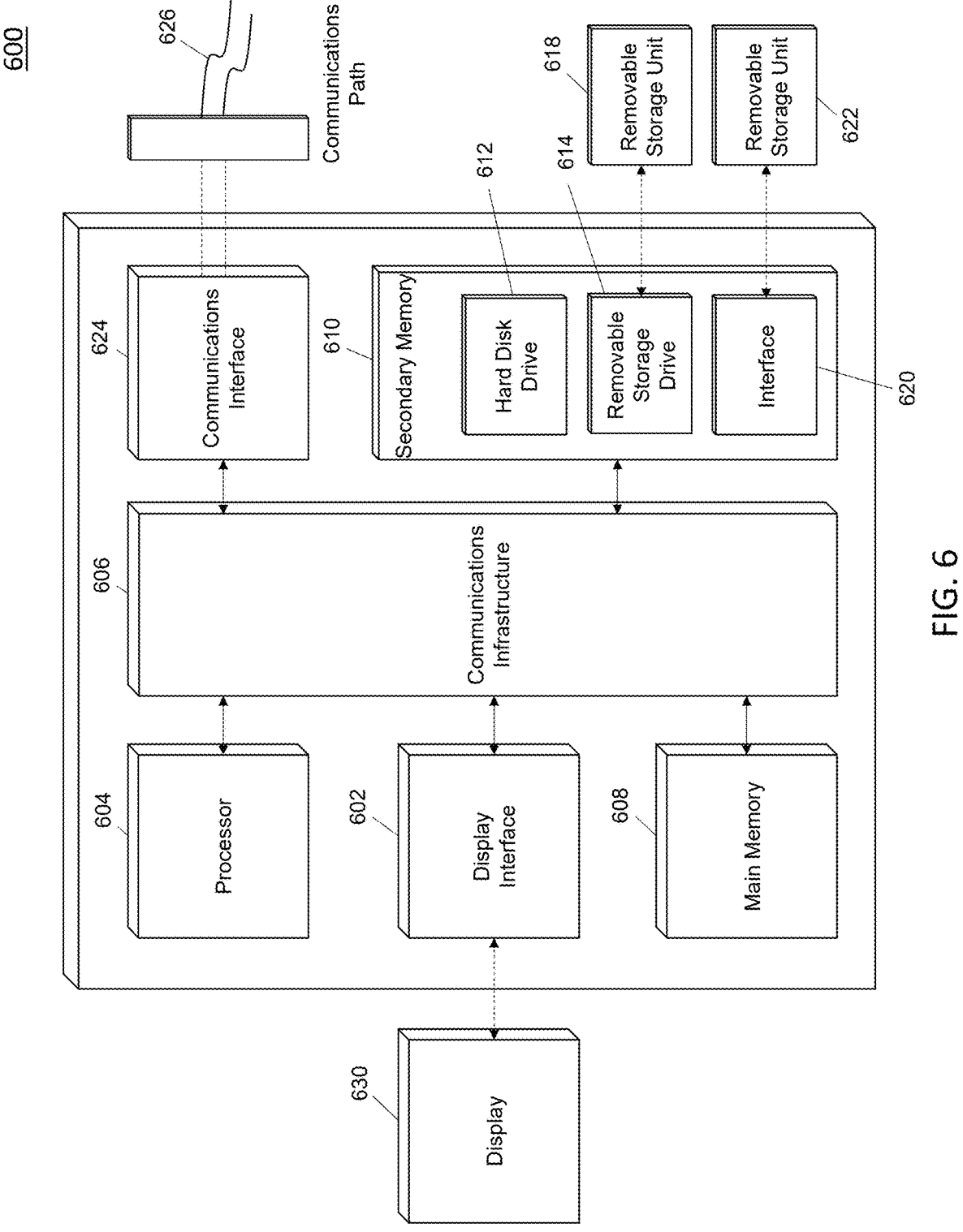
FIG. 6 is an illustration of an exemplary hardware architecture for an embodiment of a computer system for a video surveillance system.

FIG. 6 illustrates a representative computer system 600 in which embodiments of the present disclosure, or portions thereof, may be implemented as computer-readable code executed on hardware. For example, the one or more computer systems 110, 110', 122, 130, 132, 210 associated with the method and system for managing programmable Internet of Things (IoT) devices as disclosed herein may be implemented in whole or in part by a computer system 600 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this representative computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

A processor device 604 may be processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc. Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 1-5, as discussed herein. Accordingly, such computer programs may represent controllers of the computer system 600. Where the present disclosure is implemented using software executed on hardware, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software executed on hardware, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present disclosure may be implemented such that its software part has been written onto a recording medium in advance and will be read as required in operation.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112 (f) unless traditional means-plus-function language is expressly recited, such as "means for" or "step for" language being expressly recited in the claim(s).

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for managing programmable Internet of Things (IoT) devices, the method comprising:

obtaining, by a computer system, data associated with supported protocols for configuring a plurality of IoT devices;

obtaining, by the computer system, configuration operations for the plurality of IoT devices;

curating, by the computer system, configuration abstractions from the data associated with supported protocols for configuring, operational diagnostics, and security of the plurality of IoT devices and the configuration operations for the plurality of IoT devices;

transforming, by the computer system, the configuration abstractions for the plurality of IoT devices into software-defined configuration abstractions, the software-defined configuration abstractions being configured into a plurality of groups of IoT devices, wherein the software-defined configuration abstractions include one or more of grouping of IoT devices, policy and rules for the one or more grouping of IoT devices, and configuration tables for the one or more grouping of IoT devices, and each of the plurality of IoT devices within each of the plurality of groups of IoT devices has a same configuration protocol; and provisioning, by the computer system, a configuration during a configuration process from the software-defined configuration abstractions for the plurality of IoT devices to at least one of the plurality of groups of IoT devices.

2. The method according to claim 1, further comprising:

generating, by the computer system, a software-defined ready control plane with the software-defined configuration abstractions for the plurality of IoT devices.

3. The method according to claim 1, wherein the software-defined configuration abstractions include only those software-defined configuration abstractions that are supported business applications.

4. The method according to claim 3, wherein the supported business applications include one or more applications for generating revenue, improving efficiency, and conserving resources with the plurality of IoT devices.

5. The method according to claim 1, further comprising:

curating, by the computer system, the configuration abstractions for the plurality of IoT devices that are specific to each supported business application.

6. The method according to claim 1, further comprising:

forwarding, by the computer system, the configuration from the configuration abstractions for the plurality of IoT devices to the more than one of the one or more IoT devices in a Hypertext Transfer Protocol Secure (https) communication.

7. The method according to claim 1, wherein the plurality of IoT devices comprises a plurality of different IoT devices, the plurality of IoT devices being one or more of cameras and sensors.

8. The method according to claim 1, further comprising:

mapping, by the computer system, IoT device-type specific mapping raw configurations, IoT device generated alerts, and notifications of the plurality of IoT devices.

9. The method according to claim 8, further comprising:

manually mapping, onto the computer system, the IoT device-type specific mapping raw configurations, the IoT device generated alerts, and the notifications of the plurality of IoT devices.

10. The method according to claim 1, further comprising:

receiving, by the computer system, data from one or more of the plurality of IoT devices; and discovering, by the computer system, the one or more of the plurality of IoT devices based on the data received from the one or more of the plurality of IoT devices via a browser.

11. The method according to claim 10, further comprising:

discovering in real-time, by the computer system, the one or more of the plurality of IoT devices based on the data received from the one or more of the plurality of IoT devices via the browser.

12. The method according to claim 1, further comprising:

monitoring and managing, by the computer system, the configuration abstractions from the software-defined configuration abstractions for the plurality of IoT devices.

13. A non-transitory computer-readable storage medium having program instructions embodied therewith, the program instructions executable by a computer to cause the computer to perform a process for managing programmable Internet of Things (IoT) devices, the process comprising:

obtaining data associated with supported protocols for configuring a plurality of IoT devices;

obtaining configuration operations for the plurality of IoT devices;

curating configuration abstractions from the data associated with supported protocols for configuring, operational diagnostics, and security of the plurality of IoT devices and the configuration operations for the plurality of IoT devices;

transforming the configuration abstractions for the plurality of IoT devices into software-defined configuration abstractions, the software-defined configuration abstractions being configured into a plurality of groups of IoT devices, wherein the software-defined configuration abstractions include one or more of grouping of IoT devices, policy and rules for the one or more grouping of IoT devices, and configuration tables for the one or more grouping of IoT devices, and each of the plurality of IoT devices within each of the plurality of groups of IoT devices has a same configuration protocol; and provisioning a configuration during a configuration process from the software-defined configuration abstractions for the plurality of IoT devices to at least one of the plurality of groups of IoT devices.

14. The non-transitory computer-readable storage medium according to claim 13, further comprising:

generating, by the computer system, a software-defined ready control plane with the software-defined configuration abstractions for the plurality of IoT devices.

15. The non-transitory computer-readable storage medium according to claim 13, wherein the software-defined configuration abstractions include only those software-defined configuration abstractions that are supported business applications.

16. A controller comprising:

a processor configured to:

obtain data associated with supported protocols for configuring a plurality of IoT devices;

obtain configuration operations for the plurality of IoT devices;

curate configuration abstractions from the data associated with supported protocols for configuring, operational diagnostics, and security of the plurality of IoT devices and the configuration operations for the plurality of IoT devices;

transform the configuration abstractions for the plurality of IoT devices into software-defined configuration abstractions, the software-defined configuration abstractions being configured into a plurality of groups of IoT devices, wherein the software-defined configuration abstractions include one or more of grouping of IoT devices, policy and rules for the one or more grouping of IoT devices, and configuration tables for the one or more grouping of IoT devices, and each of the plurality of IoT devices within each of the plurality of groups of IoT devices has a same configuration protocol; and provision a configuration during a configuration process from the software-defined configuration abstractions for the plurality of IoT devices to at least one of the plurality of groups of IoT devices.

17. The controller according to claim 16, wherein the processor is further configured to:

generate a software-defined ready control plane with the software-defined configuration abstractions for the plurality of IoT devices.

* * * * *